(12) United States Patent
Lifvenborg

(10) Patent No.: US 7,836,783 B2
(45) Date of Patent: Nov. 23, 2010

(54) FORCE MEASURING DEVICE

(75) Inventor: Ulf A. Lifvenborg, Vasteras (SE)

(73) Assignee: ABB AB (SE)

( * ) Notice: Subject to any disclaimer, the term of this patent is extended or adjusted under 35 U.S.C. 154(b) by 0 days.

(21) Appl. No.: 12/098,255

(22) Filed: Apr. 4, 2008

(65) Prior Publication Data

US 2008/0184818 A1    Aug. 7, 2008

Related U.S. Application Data

(63) Continuation of application No. PCT/SE2006/050356, filed on Sep. 28, 2006.

(30) Foreign Application Priority Data

Oct. 7, 2005    (SE)    .................................... 0502207

(51) Int. Cl.
    *G01L 1/12*    (2006.01)
(52) U.S. Cl. .................................................. 73/862.69
(58) Field of Classification Search .............. 73/862.69, 73/114.16, 114.18, 114.21, 714
    See application file for complete search history.

(56) References Cited

U.S. PATENT DOCUMENTS

| | | | |
|---|---|---|---|
| 2,053,560 A * | 9/1936 | Janovsky .................. | 73/862.69 |
| 2,895,332 A * | 7/1959 | Dahle et al. ............... | 73/862.69 |
| 3,103,810 A | 9/1963 | Agerman et al. | |
| 3,203,234 A | 8/1965 | Westcott, Jr. et al. | |
| 3,861,203 A | 1/1975 | Dahle et al. | |
| 3,975,685 A * | 8/1976 | Bielsten et al. ............ | 324/220 |
| 4,474,069 A * | 10/1984 | Blomkvist et al. ........ | 73/862.69 |
| 4,751,849 A * | 6/1988 | Paros et al. ............... | 73/862.59 |
| 4,955,241 A * | 9/1990 | Schiessle et al. ......... | 73/862.69 |
| 5,007,295 A * | 4/1991 | Gustafsson et al. ...... | 73/862.69 |
| 5,388,464 A * | 2/1995 | Maddison .................... | 73/856 |
| 5,942,697 A * | 8/1999 | Hesthamar et al. ....... | 73/862.69 |
| 6,832,528 B2 * | 12/2004 | Selig et al. ............. | 73/862.636 |

FOREIGN PATENT DOCUMENTS

| | | |
|---|---|---|
| SE | 151267 | 8/1955 |
| WO | 8908826 A1 | 9/1989 |

OTHER PUBLICATIONS

International Search Report, Jan. 10, 2007, 4 pages.

* cited by examiner

*Primary Examiner*—Lisa M Caputo
*Assistant Examiner*—Octavia Davis
(74) *Attorney, Agent, or Firm*—St. Onge Steward Johnston & Reens LLC

(57) ABSTRACT

A device for measuring mechanical forces comprising a sensor adapted to measure difference of stresses in two orthogonal measuring directions. The device comprises at least one force receiving element adapted to receive the forces to be measured, and the sensor is adapted to measure the forces applied to the force receiving element. The device further comprises a converter of a tubular shape, adapted to transfer the forces from the force receiving element to the sensor and to convert the forces received by the receiving element into forces suitable for the sensor, the force receiving element comprises a flange extending outward in a radial direction from the converter, and the force receiving element and the sensor are mounted at a distance from each other along the longitudinal axis of the converter.

16 Claims, 2 Drawing Sheets

FORCE MEASURING DEVICE

CROSS-REFERENCE TO RELATED APPLICATIONS

The present application is a continuation of pending International patent application PCT/SE2006/050356 filed on Sep. 28, 2006 which designates the United States and claims priority from Swedish patent application 0502207-4 filed on Oct. 7, 2005, the content of which is incorporated herein by reference.

FIELD OF THE INVENTION

The present invention relates to a device for measuring mechanical forces. The device according to the invention is, for example, suitable for measuring strip tension in the steel industry or to measure forces on paper in the paper industry.

BACKGROUND OF THE INVENTION

It is known in the art to measure forces by means of a sensor adapted to measure difference of stresses in two orthogonal measuring directions. For example, a magnetoelastic force sensor is known from Swedish patent number 151267. The force sensor comprises a measuring body of a magnetoelastic material, and two coils enclosing at least a part of the measuring body and arranged such that the mutual inductance of the coils is essentially zero, when no force is acting on the measuring body, and one of the coils, denoted a magnetizing coil, is connected to a source of current, and the other coil, denoted a measuring coil, is connected to a voltmeter. This sensor utilizes the fact that, when a magnetostrictive material is exposed to a mechanical stress, the permeability in the stress direction is changed. The sensor measures the difference of stresses in two orthogonal measuring directions in the measuring body, which is a measure of the forces acting on the measuring body. The sensor is able to measure compressive/tensile forces, as well as shear forces, in dependence of the direction of its mounting. It is also known to measure forces by means of two orthogonally mounted strain gauges.

In order to function properly, the force sensor must be provided with appropriate stress conditions. Appropriate stress conditions are: two axial stresses in the measuring body, an appropriate relation between the two axial stresses, and an appropriate level of the stresses in the measuring body. Preferably, the relation between the two axial stresses is minus one, which means equal magnitude, but opposite directions of the stresses. The appropriate level of stresses in the measuring body depends on the type of sensor. A magnetoelastic sensor requires lower level of the stresses than a strain gauge, in order to function properly. Accordingly, it is a desire to be able to control the magnitude and direction of the stresses in the sensor.

The optimal level of stresses for the magnetoelastic force sensor is relatively low, which makes it difficult to measure large forces with this type of sensor. To be able to measure forces, which are larger than the optimal forces for the sensor, the measuring body is designed with an increased amount of material in the direction of the applied force in order to reduce the level of stresses in the measuring body. A problem with this solution is that it puts high demand on the surrounding structure, which makes it is difficult to manufacture. The large amount of material also introduces thermal problems, which affects the measurement.

SUMMARY OF THE INVENTION

The object of the present invention is to provide an improved device for measuring mechanical forces.

This object is achieved by a device as defined in the claims.

Such a device comprises a converter of a tubular shape, adapted to transfer the forces from the force receiving element to the sensor and to convert the forces received by the receiving element into forces suitable for the sensor, in order to allow the sensor to operate under optimal conditions. The force receiving element comprises a flange extending outward in a radial direction from the converter, and the force receiving element and the sensor are mounted at a distance from each other along the longitudinal axis of the converter. The force receiving element and the sensor are mounted at a distance from each other in a direction perpendicular to the orthogonal measuring directions of the sensor.

The function of the converter is to create optimal stress conditions in the electro magnetic force sensor. The forces to be measured are applied to the force receiving element, and the converter transforms the forces to appropriate stresses for the sensor.

The converter is, for example, designed to convert uniaxial stresses exerted on the force receiving element to two-axial stresses in the sensor, and to provide a desired relation between the two-axial stresses. The uniaxial stresses are either compressive/tensile or shear stresses. The shape of the converter accomplishes the desired conversion and relation between the stresses. Symmetric and uniform two-axial stresses in the measuring body make the sensor operate optimal, and thus improve the measuring result of the measuring device.

The converter is, for example, designed to reduce the amplitude of the received force to a level suitable for the sensor. The magnitude of the stresses is controlled by the stiffness of the converter, i.e. the length and thickness of the converter. The stiffness of the force receiving element also affects the reduction of forces. When large forces are measured, the converter is preferably designed to reduce the amplitude of the received force to a level suitable for the sensor. Thereby, it is possible to measure forces, which are larger than the sensor is designed for.

Preferably, the force measuring device is adapted to be integrated in an outer structure, for example a load cell. When the level of stresses in the sensor is controlled, the outer structure can be minimized and exposed for higher tension. While the converter can give the desired stress condition in the sensor, the outer structure can be optimized for other purposes. A smaller area of the force carrying structure gives a better integration of the force to be measured, and less sensitivity to stresses and temperature changes.

Thus, the invention makes it possible to minimize the outer structure, decrease the force-carrying material, and still get the right stress condition for the sensor. The invention makes it possible to design measuring devices for measuring forces from 1 kN to 1000 kN.

The converter has a tubular shape, and the force receiving element and the sensor are mounted at a distance from each other along the longitudinal axis of the converter. Preferably, the sensor is arranged inside the tubular converter so that a measuring body of the sensor is in mechanical contact with a part of the wall of the converter, and the force receiving element is mounted on the outside of the converter. The tubular shape is suitable for transferring the force to the sensor. Due to the tubular shape of the converter, the uniaxial stresses on the force receiving element is converted into two-axial stresses in the sensor. Thanks to the tubular shape, the amount of material necessary to accomplish the reduction of the forces is reduced, and thereby the influence from thermal variations is reduced.

According to an embodiment of the invention the distance between the force receiving element and the sensor is in the interval of 5-100 mm. The property of the converter that mostly influences the gear reduction of the applied force is the distance between the force receiving element and the sensor, i.e. the length of the converter. A distance in the interval of 5-100 mm accomplishes a gear reduction factor of approximately 2-20. Preferably, the distance between the force receiving element and the sensor is larger than 5 mm. It has been proven that the relation between the principal stresses in the sensor becomes close to one if the distance between the force receiving element and the sensor is lager than 5 mm.

According to an embodiment of the invention, the thickness of the wall of the converter is in the interval 0.5-10 mm. The thickness of the wall of the tubular converter also has an influence on the gear reduction of the applied force, however, not in the same degree as the distance between the force receiving element and the sensor.

According to an embodiment of the invention the converter has a cylindrical shape. Thanks to the cylindrical shape of the converter it is possible to control the relation between the principal stresses in the sensor, since the relation between the principal stresses in the sensor depends on the relation between two orthogonal diameters of the cylinder.

According to an embodiment of the invention, the converter has a circular cylindrical shape. Thanks to the circular cylindrical shape of the converter, the relation between the principal stresses in the sensor becomes minus one, which means that they have the same magnitude but different directions. This relation of the two-axis stresses is an optimal condition for the sensor.

According to an embodiment of the invention, the converter and the force receiving element are rotationally symmetrical about the longitudinal axis of the converter. For example, the force receiving element is a flange extending outwards in a radial direction from the converter. Due to the rotation symmetry of the converter and the force receiving element, and the ability to control stresses in the sensor and thermal flow, the converter becomes almost insensitive to forces in not measured directions.

According to an embodiment of the invention the device comprises a second force receiving element mounted on the opposite side of the sensor along the longitudinal axis of the converter, and at essentially equal distance from the sensor as the first mentioned force receiving element. If the device only has one force receiving element, the forces on the measuring body of the sensor becomes one-sided and there is a risk that the measuring body becomes curved, which might be detrimental to the force measuring. This embodiment provides an improved measurement, since the forces on the measuring body of the sensor becomes equal on both sides of the body, and thereby bending of the body is prevented.

According to an embodiment of the invention the sensor comprises a measuring body of a magnetoelastic material, and two coils enclosing at least a part of the measuring body and arranged such that the mutual inductance of the coils is essentially zero, when no force is acting on the measuring body, and one of the coils is connected to a source of current, and the other coil is connected to an electrical measuring device. The invention is particularly useful for this type of sensor, which has a high demand on the stress conditions in order to function properly.

According to an embodiment of the invention, the measuring body, the converter, and the force receiving element are made of a magnetoelastic material, and the converter, the force receiving element, and the measuring body are made in one piece. This embodiment makes it possible to manufacture the measuring body, the converter, and the force receiving element in one piece, and thereby to reduce the manufacturing costs.

BRIEF DESCRIPTION OF THE DRAWINGS

The invention will now be explained more closely by the description of different embodiments of the invention and with reference to the appended figures.

DETAILED DESCRIPTION OF THE INVENTION

Figure 1:
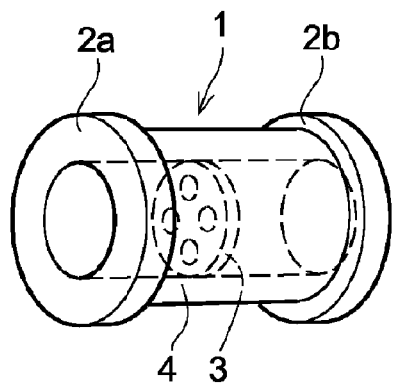
FIG. 1 shows a perspective view of a device for measuring mechanical forces according to an embodiment of the invention.
Figure 2:
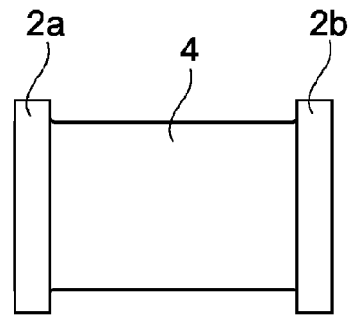
FIG. 2 shows a side view of the device in FIG. 1.
Figure 3:
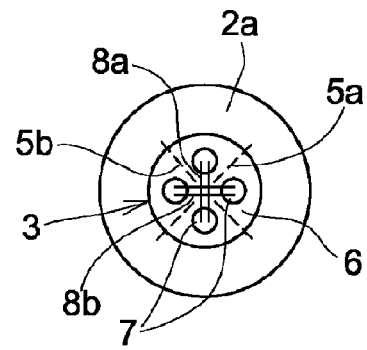
FIG. 3 shows a front view of the device in FIG. 1.

FIGS. 1, 2, and 3 show a device 1 for measuring mechanical forces according to an embodiment of the invention. The device 1 comprises two force receiving elements 2a-b adapted to receive the forces to be measured, a sensor 3 adapted to measure difference of stresses in two orthogonal measuring directions 5a-b, and a converter 4 adapted to transfer the forces from the force receiving elements 2a-b to the sensor 3, and to convert the forces received into forces suitable for the sensor. The converter 4 is disposed between the force receiving element and the sensor. The sensor is for example a magnetoelastic sensor or a strain gauge. In this embodiment the sensor is a magnetoelastic sensor comprising a measuring body 6 made of a magnetoelastic material having four through holes 7, and two orthogonally mounted coils 8a-b wound through the holes 7, and arranged such that the mutual inductance of the coils is essentially zero with no forces acting on the measuring body. One of the coils 8a, the magnetizing coil, is connected to a source of current, and the other coil 8b, the measuring coil, is connected to a voltmeter.

The first force receiving element 2a is mounted at a distance from the sensor 3 in a direction perpendicular to the measuring direction of the sensor, which is also orthogonal to the plane of extension of the measuring body 6 of the sensor. The second force receiving element 2b is mounted at an equal distance from the sensor 3 but in an opposite direction. The distance between the force receiving element 2a-b and the sensor 3 is preferably in the interval 5-100 mm. The thickness of the wall of the converter is preferably in the interval of 0.5-10 mm.

The converter 4 has a hollow, tubular shape and is, in this embodiment, made of a magnetoelastic material, such as martensitic stainless steel. As shown in the figures, the converter 4 has a circular cylindrical cross section. The sensor 3 is arranged inside the tubular converter so that the measuring body 6 of the sensor is in direct contact with a part of the wall of the converter. The force receiving elements 2a-b has the shape of flanges extending outward in a radial direction from the converter 4. The first flange 2a is disposed in one end of the converter, the second flange 2b is disposed in the opposite end of the converter, and the sensor 3 is disposed in the middle of the converter 4. The force to be measured is applied at the flanges 2a-2b. The converter 4 will then create the right principal stresses for the sensor 3. The magnitude of the stresses is controlled by the stiffness of the converter, i.e. its length and thickness, and the stiffness of the flanges 2a-b, i.e. their width and height. Preferably, the measuring body, the flanges, and the converter are made in one piece of a magnetoelastic material, such as martensitic stainless steel.

Figure 4:
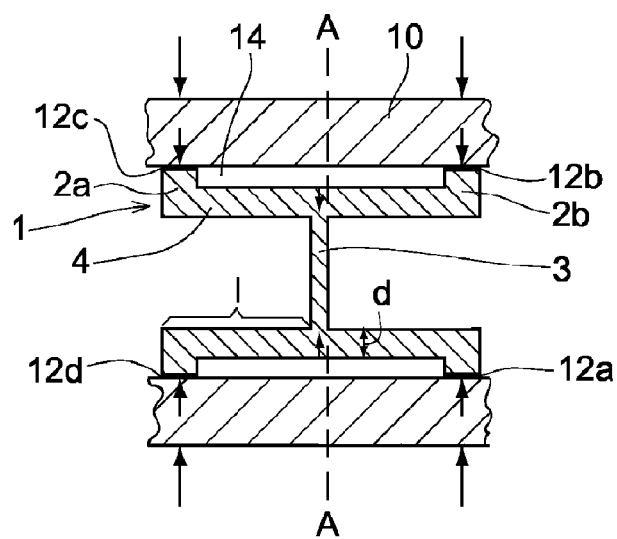
FIG. 4 shows the device in FIG. 1 mounted in an outer structure.

Preferably, the converter 4 is mounted in an outer structure 10, as shown in FIG. 4. The outer structure is for example a load cell. FIG. 4 shows a longitudinal cross section through the force measuring device 1 and the outer structure 10. The outer structure 10 is mounted in direct contact with the force receiving elements 2a-b. Thus, the flanges 2a-b also function as fastening elements for fastening the outer structure 10. The measuring device 1 is connected to the outer structure 10 by weld joints 12a-d. The outer structure 10, the flanges 2a, 2b, and the converter 4 define a hollow space 14, which allows the wall of converter to be deformed due to the transferred forces. The device 1 and the outer structure 10 are for example welded together by means of laser welding. In order to reduce internal stresses in the measuring body after manufacturing, a sub treatment is useful, for example heat treatment.

Arrows in FIG. 4 illustrate the forces in the device. As shown in FIG. 4, forces acting on the outer structure are transferred through the material of the outer structure to the force receiving elements 2a-b. The forces acting on the force receiving elements 2a-b are then transferred to the sensor 3 via the converter 4, and by then the magnitude of the forces is reduced in dependence of the distance l between the force receiving elements 2a-b and the sensor 3 and the thickness d of the converter 4. The distance l and the thickness d are adjusted to the forces to be measured. Depending on the shape of the converter and the force receiving elements, the device can be adjusted for measuring forces on the outer structure from 1 kN to 1000 kN.

The dimensions of the converter and the flanges control the amplitude of the stresses in the measuring body and the relation between compressive/tensile stresses. When the flanges 2a-b are exposed to compressive or shear forces, the converter transforms them to two-axial compressive/tensile stresses perpendicular to each other in the measuring body of the sensor. Accordingly, the sensor is exposed to stresses that are optimal for this type of sensor. Simulations have shown that when the total length of the converter is more than 10 mm, the relation between compressive and tensile stresses in the sensor is about 0.9-1.1. By adjusting the thickness of the wall of the converter, and the dimensions of the flanges, it is possible to adjust the relation to be about 1. In the same way as for the stresses, the converter reduces the temperature gradient over the measuring body. A converter that reduces the stresses by 20%, also reduces the temperature gradient over the measuring body by about 20%.

For example, a force measuring device as shown in FIG. 1 suitable for measuring low forces, such as 1-5 kN, may have a converter with a diameter of 15-20 mm, a length of 10-15 mm, and a wall thickness of 1-2 mm, and a force receiving element having a height of 1-2 mm and width of 1-3 mm. This force measuring device reduces the applied forces with a factor of about 1.5-3.

For example, a force measuring device as shown in FIG. 1 suitable for measuring large forces, such as 200-1000 kN may have a converter with a diameter of 30-35 mm, a length of 40-50 mm, and a wall thickness of 3-4 mm, and a force receiving element having a height of 2-5 mm and width of 3-5 mm. This force measuring device reduces the applied forces with a factor of about 5-20.

Figure 5:
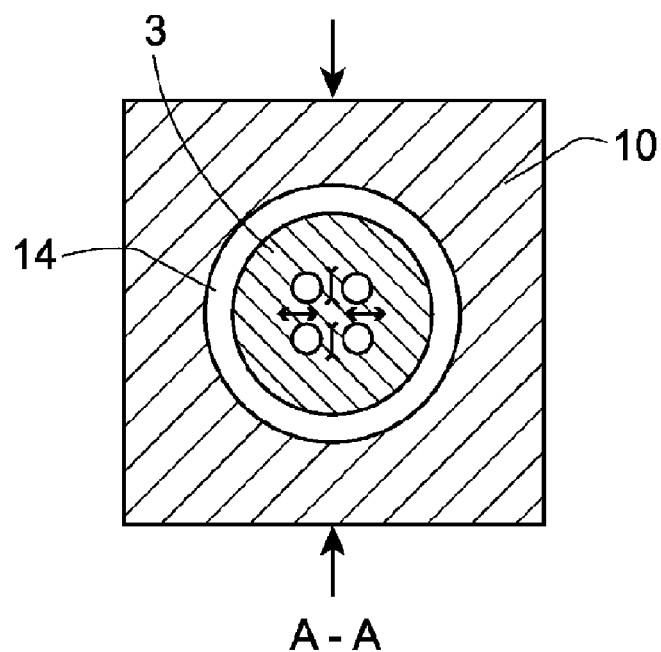
FIG. 5 shows a cross section through the device shown in FIG. 4 along a line A-A.

The force measuring device 1 is able to measure compressive/tensile forces, as well as sheer forces, in dependence of the direction of its mounting. FIG. 5 shows the sensor 3 mounted for measuring compressive forces acting on the outer structure 10. The compressive forces acting on the outer structure 10, illustrated by arrows in FIG. 5, create uniaxial compressive stresses in the outer structure. The uniaxial compressive stresses in the outer structure are converted to two-axial stresses in the measuring body 6 of the sensor 3. The two-axial stresses include compressive stresses acting in the same direction as the applied forces, and tensile stresses acting in a direction perpendicular to the applied forces. Arrows in FIG. 5 illustrate the compressive and tensile stresses in the measuring body. Thus the compressive forces acting on the outer structure 10 results in two-axial orthogonal tensile and compressive stresses in the measuring body 6. The sensor 3 is adapted to measure the difference between the compressive and tensile stresses in the measuring body.

Figure 6:
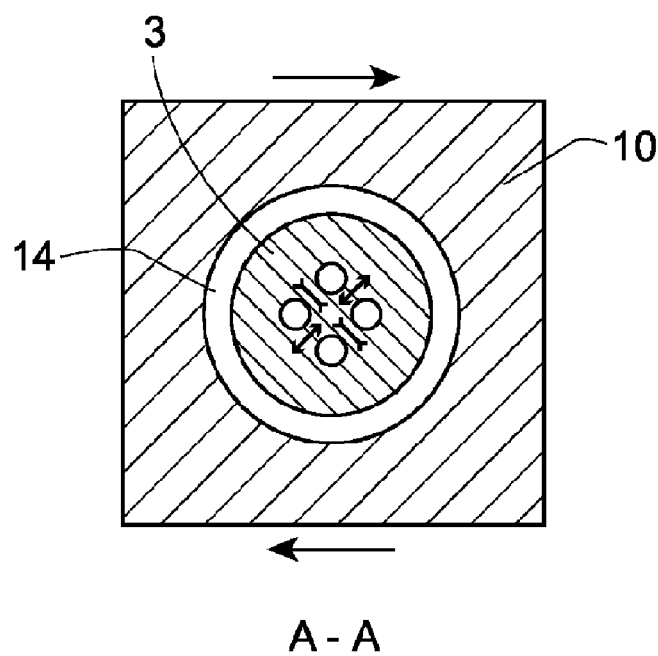
FIG. 6 shows a cross section through an alternative embodiment of the device shown in FIG. 4.

FIG. 6 shows the sensor 3 mounted for measuring shear forces acting on the outer structure 10. The sensor 3 is turned 45 degrees compared to the mounting for measuring compressive forces, as shown in FIG. 5. The shear forces acting on the outer structure 10, illustrated by arrows in FIG. 6, create uniaxial shear stresses in the outer structure. The uniaxial shear stresses in the outer structure are converted to two-axial stresses in the measuring body 6 of the sensor 3. The two-axial stresses include compressive stresses acting in a direction turned 45 degrees from the applied forces, and tensile stresses acting in a direction perpendicular to the compressive stresses in the measuring body. Arrows in FIG. 6 illustrate the compressive and tensile stresses in the measuring body. Thus, the shear forces acting on the outer structure 10 results in two-axial orthogonal tensile and compressive stresses in the measuring body of the sensor 3. The sensor 3 is adapted to measure the difference between the compressive and tensile stresses in the measuring body.

The term comprises/comprising when used in this specification is taken to specify the presence of stated features, integers, steps or components. However, the term does not preclude the presence or addition of one or more additional features, integers, steps or components or groups thereof.

The present invention is not limited to the embodiments disclosed but may be varied and modified within the scope of the following claims. For example, the shape of the tube could be varied. For example, the cross section of the tube could be made oval. In another embodiment, the device may include only one force receiving element, which is mounted at one end of the converter and the sensor is mounted at the other end of the converter. The converter and the force receiving elements can be made of any material which has the strength to withstand the applied forces and which does not influence the measuring.

What is claimed is:

1. A device for measuring mechanical forces comprising:
   a sensor adapted to measure difference of stresses in two orthogonal measuring directions,
   at least one force receiving element adapted to receive the forces to be measured, and the sensor is adapted to measure the forces applied to the force receiving element,
   a tubular converter having a longitudinal axis, adapted to transfer the forces from the force receiving element to the sensor and to convert the forces received by the receiving element into forces suitable for the sensor, wherein:

the converter is arranged such that its longitudinal axis is orthogonal or approximately orthogonal to the two measuring directions, the force receiving element comprises a flange extending outward in a radial direction from the converter, the force receiving element and the sensor are mounted at a distance (I) from each other along the longitudinal axis of the converter, and the converter is hollow along the distance (I).

2. The device according to claim 1, wherein said converter is designed to convert uniaxial stress exerted on said force receiving element to two-axial stresses in the sensor.

3. The device according to claim 2, wherein said converter is designed to reduce the amplitude of the received force to a level suitable for the sensor.

4. The device according to claim 1, wherein said converter is designed to reduce the amplitude of the received force to a level suitable for the sensor.

5. The device according to claim 1, wherein said distance is in the interval 5-100 mm.

6. The device according to claim 1, wherein the thickness of the wall of the converter is in the interval 0.5-10 mm.

7. The device according to claim 1, wherein the converter has a cylindrical shape.

8. The device according to claim 1, wherein the converter has a circular cylindrical shape.

9. The device according to claim 1, wherein the converter and the force receiving element are rotationally symmetrical about the longitudinal axis of the converter.

10. The device according to claim 1, wherein the device comprises a second force receiving element mounted on the opposite side of the sensor along the longitudinal axis of the converter, and at essentially equal distance from the sensor as the first mentioned force receiving element.

11. The device according to claim 1, wherein the sensor is a magnetoelastic sensor.

12. The device according to claim 1, wherein the sensor comprises a measuring body of a magnetoelastic material, and two coils enclosing at least a part of the measuring body and arranged such that the mutual inductance of the coils is essentially zero, when no force is acting on the measuring body, and one of the coils is connected to a source of current, and the other coil is connected to an electrical measuring device.

13. The device according to claim 1, wherein the sensor comprises a measuring body and is arranged inside the tubular converter so that the measuring body of the sensor is in mechanical contact with a part of the wall of the converter.

14. The device according to claim 13, wherein the measuring body, the converter, and the force receiving element are made of a magnetoelastic material, and the converter, the force receiving element, and the measuring body are made in one piece.

15. The device according to claim 1, wherein the device is adapted to be integrated in a load cell.

16. The device according to claim 1, wherein the device is suitable for measuring forces from 1 kN to 1000 kN.

* * * * *